UNITED STATES PATENT OFFICE.

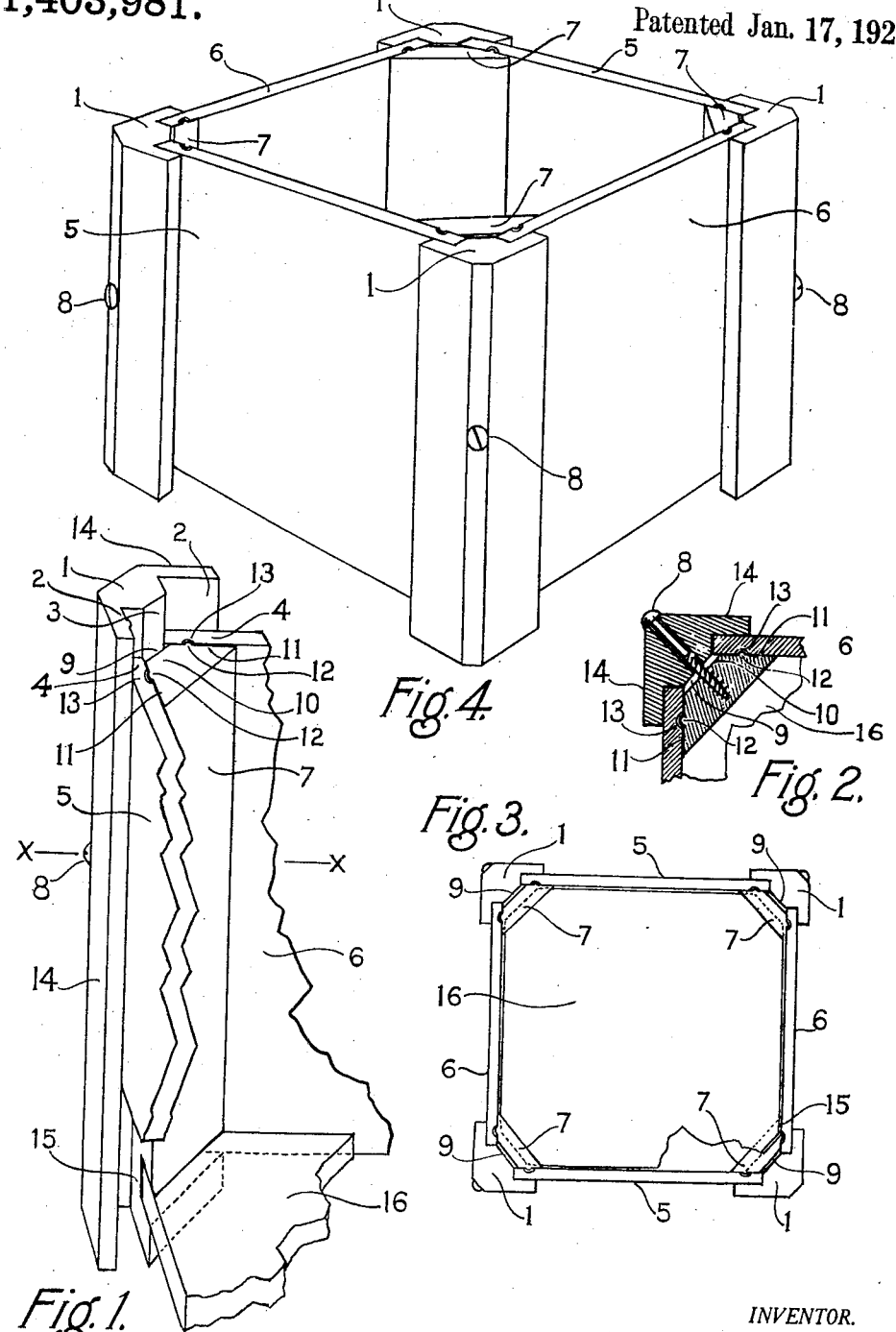

CHARLES H. SMITH, OF MALDEN, MASSACHUSETTS.

ASSEMBLING DEVICE FOR LOCKING TOGETHER KNOCKDOWN STRUCTURES.

1,403,981.

Specification of Letters Patent.    Patented Jan. 17, 1922.

Application filed February 11, 1920.   Serial No. 357,887.

*To all whom it may concern:*

Be it known that I, CHARLES H. SMITH, a citizen of the United States, residing at Malden, in the county of Middlesex and State of Massachusetts, have invented certain new and useful Improvements in Assembling Devices for Locking Together Knockdown Structures, of which the following is a specification.

My invention relates to improvements in assembling devices for locking together knockdown structures.

One of the objects of the invention is to provide a simple, practical and efficient assembling device, in which means are provided for readily and quickly locking together the separate parts of knockdown structures, so that the completed structure will be firmly held together and will thus form a substantial structure, while the whole structure may be easily taken apart by simply releasing a few screws or bolts.

Another object is to provide means whereby the pressure of the locking member may be increased and so regulated that the sides of the structure will be held so firmly in the assembling member that they will be securely fastened in a fixed position.

Another object is to provide means whereby any possibility is prevented of the sides of the structure being wrenched out of their locked position, when the structure is subjected to any unusual lateral strain.

Another object is to provide locking means which will hold not only the sides, but the top and bottom of a structure as well in a rigid position, thereby preventing lateral movement or wabbling of the parts when in use.

In the accompanying drawings Figure 1 is an isometric view of the assembling device and co-operating parts, partly in section. Fig. 2 is a cross-section on the line $x$—$x$, Fig. 1. Fig. 3 is a plan, partly in section, showing the means for holding and locking the bottom of the structure in position. Fig. 4 is an isometric view showing an assembled structure.

Latitude is allowed herein as to details, since they may be varied or changed at will without departing from the spirit or scope of my invention.

Corresponding and like parts are referred to in the following description and indicated in all the figures of the drawings by the same reference characters.

In the drawings 1 designates an assembling member of wood or other suitable material provided on its inner side with lateral portions 2 provided with longitudinal recesses $2^a$ and provided also with an intervening portion 3 between the lateral portions 2 for the purpose referred to below. The lateral portions 2 are adapted to receive and hold in the longitudinal recesses $2^a$ of the assembling member 1 the edges 4 of the adjacent sides 5 and 6 of a structure, whatever it may be, while a locking member 7 is placed against the edges 4 of the sides 5 and 6 and clamped securely against the edges 4 by means of screws or bolts 8, thereby holding and locking the sides 5 and 6 securely in a fixed position in the assembling member 1. The recesses $2^a$ in the lateral portions 2 are so positioned and are made deep enough to hold only a portion of the sides 5 and 6, thereby causing each side to protrude beyond the assembling member 1, as shown in Fig. 2, so that when the parts are brought together for assembling there is a space 9 provided between the intervening portion 3 and the projection 10 of the locking member 7, so that the projection 10 may have room to approach the intervening portion 3 and thus the pressure of the locking member 1 upon the edges 4 of the sides 5 and 6 may be increased and so regulated that the parts will be held more securely than would be the case, if there were no space 9 provided. While both the intervening portion 3 and the projection 10 are preferably made relatively wide, they may be of any suitable width. This is an important feature, especially when the sides 5 and 6 are of some relatively yielding material such as cardboard or wall board, since greater pressure can then be imparted to the locking member 7 in locking together the sides 5 and 6 and the co-operating parts and thus any variation in thickness of material can be taken care of readily.

The locking member 7 is provided on its inner sides 11 with a longitudinal ridge 12 adapted to enter into and co-operate with a longitudinal groove or scoring 13 on the edge 4 of the sides 5 and 6 and thereby prevent any possibility of the sides 5 and 6 being wrenched out of their locked position in the assembling member 1, when the structure is subjected to any unusual lateral strain. It is preferable to have the inner sides 11 of the locking member 7 relatively wider than the sides 14 of the assembling member 1, so as to increase the rigidity of the assembled structure and prevent lateral loosening or wabbling of the assembled parts.

A transverse groove 15 in the lower part of the locking member 7 is adapted to receive and hold the bottom 16 of the structure securely in position, when the parts are assembled to form a structure, as the receptacle shown in Fig. 4. If it is desired to build a container provided with a closure member or cover a similar transverse groove 15 to receive and hold the top is also provided in the upper part of the locking member 7.

In use the sides 5 and 6 of a structure are first inserted in the longitudinal recesses 2ª, then the locking member 7 is placed against the edges 4 of the sides 5 and 6 and clamped securely against them by adjusting the screws 8, the projection 10 of the locking member 7 approaching the intervening portion 3 of the assembling member 1 through the space 9 and thus allowing the locking member 7 to exert a strong pressure upon the edges 4 and consequently hold and lock the sides 5 and 6 securely in posiiton in the assembling member 1. In order to build any desired structure it is only necessary to employ a sufficient number of assembling members 1 with co-operating parts to hold and lock together the sides 5 and 6 of the structure, whatever may be its form, whether rectangular, triangular or any other shape.

In assembling a complete structure, as the receptacle shown in Fig. 4, the bottom 16 is inserted in its proper position in the grooves 15 of the locking members 7 of two assembling members 1, in which three sides have been previously locked in position; after which the fourth side is locked in position in the two remaining assembling members 1, the bottom 16 having been inserted in the grooves 15 of the locking members 7 of the two latter assembling members 1, when the structure is completely assembled. In assembling a container three sides, the bottom 16 and the top are locked in position in two assembling members 1, after which the remaining side, which now serves as a closure member or cover for the container, having the necessary locking members 7 attached by nails or otherwise to the edges 4 of the closure member is placed in position and the two other assembling members 1 are attached and fastened by screws 8 in position, when the structure is completely assembled, and thus is provided a compact, substantial and readily assembled container.

It is to be particularly noted that in using the assembling device the separate parts of the structure are easily and quickly locked firmly in position simply by adjusting the screws 8, while the parts may be just as readily unassembled by releasing the screws 8. Moreover, the assembling device and the co-operating parts of a given structure are of such construction that they may be readily boxed and shipped in compact, knockdown form ready to be assembled when desired.

I claim :—

1. In an assembling device for locking together knockdown structures, an assembling member having means for holding the adjacent sides of a structure and causing the said sides to protrude inwardly from the assembling member, an intervening portion in the said assembling member between the said adjacent sides, and a locking member having means co-operating with the said intervening portion and adapted to form a space between the said intervening portion and the locking member, whereby the pressure of the locking member may be regulated and increased.

2. In an assembling device for locking together knockdown structures, an assembling member having sides and an intervening portion for holding the adjacent sides of a structure and causing the said sides to protrude inwardly from the assembling member, and a locking member adapted to co-operate with the said assembling member in locking the said sides securely in a fixed position in the assembling member, the said locking member having sides and an outer face relatively wider than the sides and the intervening portion of the said assembling member respectively.

3. In an assembling device for locking together knockdown structures, an assembling member having means for holding the adjacent sides of a structure and causing the said sides to protrude inwardly from the assembling member, and a locking member adapted to co-operate with the said assembling member in locking the said sides securely in a fixed position in the assembling member, the said locking member having a transverse groove in either end part thereof adapted to receive and hold the top and bottom of the structure.

4. In an assembling device for locking together knockdown structures, an assembling member having lateral portions provided with longitudinal recesses adapted to receive and hold therein the sides of a structure, an intervening portion between the said lateral portions, a locking member adapted to co-operate with the said assembling member in locking the said sides securely in a fixed position in the assembling member, and means for securely fastening and unfastening the said locking member.

5. In an assembling device for locking together knockdown structures, an assembling member having lateral portions provided with longitudinal recesses adapted to receive and hold therein the sides of a structure, an intervening portion between the said lateral portions, a locking member adapted to co-operate with the said lateral portions and the intervening portion in locking the said sides securely in a fixed position in the assembling member, the said locking member having a transverse groove in either end part thereof adapted to hold the top or bottom of the structure, means for securely fastening and unfastening the said locking member, and a projection on the said locking member adapted to co-operate with the said sides and the said intervening portion in forming a space between the intervening portion and the projection, whereby the pressure of the locking member may be regulated and increased.

6. In an assembling device for locking together knockdown structures, an assembling member having lateral portions provided with longitudinal recesses adapted to receive and hold therein the sides of a structure, an intervening portion between the said lateral portions, a locking member adapted to co-operate with the said lateral portions and the intervening portion in locking the said sides securely in a fixed position in the assembling member, the said locking member having a transverse groove in either end part thereof adapted to hold the top or bottom of the structure, means for securely fastening and unfastening the said locking member, longitudinal ridges on the inner sides of the said locking member adapted to engage and co-operate with longitudinal grooves on the sides of the structure, and a projection on the said locking member adapted to co-operate with the said sides and the said intervening portion in forming a space between the intervening portion and the projection, whereby the pressure of the locking member may be regulated and increased.

7. In an assembling device for locking together knockdown structures, an assembling member having lateral portions provided with longitudinal recesses adapted to receive and hold therein the sides of a structure, an intervening portion between the said lateral portions, a locking member adapted to co-operate with the said lateral portions and the intervening portion in locking the said sides securely in a fixed position in the assembling member, and a projection on the said locking member adapted to co-operate with the said sides and the said intervening portion in forming a space between the intervening portion and the projection, whereby the pressure of the locking member may be regulated and increased.

8. In an assembling device for locking together knockdown structures, an assembling member having on each side thereof a lateral portion having a longitudinal recess so positioned as to hold the adjacent sides of a structure and to cause the said sides to protrude beyond the said assembling member, an intervening portion between the said lateral portions having an outer face at angle to the said lateral portions, a locking member, and a projection on the said locking member having an outer face at an angle to its sides and adapted to be parallel to the outer face of the intervening portion of the assembling member and to co-operate therewith and the sides of the structure in forming a space between the said intervening portion and the projection, whereby the pressure of the locking member may be regulated and increased.

9. In an assembling device for locking together knockdown structures, an assembling member having lateral portions for holding adjacent sides of a structure, and an intervening portion, said intervening portion having an outer face angularly disposed with relation to said lateral portions, and a locking member having sides adapted to bear against the adjacent sides of the knockdown structure and an outer face relatively wider than the outer face of the above mentioned intervening portion.

10. A device of the character stated, comprising, in combination, an assembling member having lateral portions and an intervening portion therebetween for receiving and retaining in spaced relation the adjacent sides of a knockdown structure, and a locking member having sides adapted to bear against the adjacent sides of the knockdown structure and an outer face relatively wider than the face of the above mentioned intervening portion.

In testimony whereof I have affixed my signature, in the presence of two witnesses.

CHARLES H. SMITH.

Witnesses:
 JOSEPHINE E. DODGE,
 BLANCHE A. SCOTT.